United States Patent Office 2,768,143
Patented Oct. 23, 1956

2,768,143

WATER-SOLUBLE GUM HAVING IMPROVED PROPERTIES

John E. Henry, Rivercrest, Va., assignor to Hercules Powder Company, Wilmington, Del., a corporation of Delaware No Drawing. Application March 31, 1953,
Serial No. 346,047

7 Claims. (Cl. 252—363.5)

This invention relates to water-soluble gums of improved water solubility. In a specific aspect this invention relates to water-soluble carboxyalkyl cellulose derivatives of improved water solubility. In a more specific aspect this invention relates to water-soluble sodium carboxymethylcellulose of improved water solubility.

Although sodium carboxymethylcellulose (CMC) dissolves in both hot and cold water to form colloidal solutions having numerous commercial applications, inordinately long periods of time have often been required to form such solutions. This has been a handicap which has limited the utility of CMC in many applications where rapid and easy solution with a minimum amount of agitation is necessary.

The problem is not that the individual particles of CMC are difficult to dissolve, for in reality such individual particles hydrate, swell and disperse to form a colloidal solution relatively rapidly. The difficulty lies in the fact that numerous individual particles tend to agglomerate when the material is mixed with water. Rapid hydration takes place over the surface of such agglomerated aggregates to form gel-coated lumps, and these are then extremely difficult to dissolve. This effect is aggravated by the fact that the CMC has a tendency to float on the surface of the water, allowing partially dissolved particles to agglomerate into large lumps or masses. This phenomenon is not unique in CMC but it has been observed in various other water-soluble gums in commercial use. Due to this tendency to form gelatinous lumps, it has been necessary to employ costly, powerful, high-speed mixing equipment capable of developing high shear in order to break up such lumps and facilitate rapid solution. It thus appears that the problem of increasing the rate and ease of solution of CMC and other water-soluble gums is largely one of reducing the tendency to form large gel masses and of enhancing dispersion of the individual particles of gum through the water to allow rapid hydration and solution of the individual particles without resort to costly and powerful agitation equipment. Although various expedients have been proposed to accomplish these objectives, none has been entirely satisfactory in producing a CMC of optimum water solubility.

It is an object of this invention to provide water-soluble gums of improved water solubility.

It is another object of this invention to provide water-soluble carboxyalkyl cellulose derivatives of improved water solubility.

It is a further object of this invention to provide sodium carboxymethylcellulose of improved water solubility.

Further and additional objects of this invention will be readily apparent to those skilled in the art from the detailed disclosure below.

It has been found that water-soluble gums, particularly sodium carboxymethylcellulose (CMC), having the form of porous granules, a bulk density of at least about 0.35 gram per milliliter, a particle size substantially within the range of 20–150 mesh, and containing at least about 5% by weight of at least one of certain salts as set forth hereinafter, have an unexpectedly improved rate of solution in water.

The advantages of this invention and the necessity for imparting the proper physical properties to the water-soluble gums are shown by the following examples.

EXAMPLE 1

A series of runs was made to determine the solution rate and dispersibility of various forms of CMC having a degree of substitution of 0.57 carboxymethyl radical per glucose anhydride unit and a viscosity of 135 cps. in a 2% aqueous solution. For those runs in which the CMC contained a salt, a CMC that had not been purified by the removal of reaction salts or by-products was employed. Among the reaction salts present in the CMC were sodium chloride and sodium glycolate, and the CMC contained 15% by weight of these impurities. For those runs where CMC having the form of porous granules was employed, conversion to porous granular form was effected by mixing fibrous CMC with 1.5 parts of water per part of CMC, drying the resulting CMC in a steam oven, and comminuting the dried product. For those runs where an unclassified screen fraction was employed, the CMC had a particle distribution as determined on U. S. standard mesh screens of on 50—1.0%; 100—9.2%; pan—89.8%. In each of the runs the solution rate was determined on a 1.4 weight percent solution of CMC in water at 65° C. The following data were observed.

| Run | Presence or Absence of Salt | Physical Form | Bulk Density (grams per ml.) | Screen Fraction | Solution Rate in Minutes | Dispersibility |
|---|---|---|---|---|---|---|
| 1 | Present | Fibrous | 0.58 | Unclassified | 30+ | Poor. |
| 2 | do | do | 0.58 | Through 40—on 80 | 30+ | Do. |
| 3 | do | Porous granules | 0.82 | Unclassified | 30+ | Do. |
| 4 | do | do | 0.65 | Through 40—on 80 | 1.2 | Good. |
| 5 | Absent | Fibrous | 0.51 | Unclassified | 30+ | Poor. |
| 6 | do | do | 0.35 | Through 40—on 80 | 30+ | Do. |
| 7 | do | Porous granules | 0.83 | Unclassified | 25 | Do. |
| 8 | do | do | 0.73 | Through 40—on 80 | 15 | Do. |

A comparison of the solution rate and dispersibility obtained in run 4 with the results of the other runs clearly emphasizes the importance of employing a water-soluble gum with the proper combination of physical form, bulk density, particle size, and salt content.

EXAMPLE 2

A series of runs was made employing as starting material a commercial grade of sodium carboxymethylcellulose known as Hercules CMC–70–M. This material was fibrous, had an original bulk density of approximately 0.4, was unclassified with respect to particle size distribution, and contained substantially no salt impurities or additives. This material formed gel lumps upon being mixed with water and the rate of solution was very poor. Weighed portions of this CMC were wetted with 15% aqueous solutions of the following salts in sufficient quantity in each case to introduce 25 percent by weight of salt, based on the dry CMC weight, as additive. The treated samples were then dried, ground to convert the original fibrous CMC into the form of porous granules, and sieved, and the material passing through 40-mesh and retained on 100-mesh was tested for rate of solution and dispersibility. In every case the bulk density of the classified material containing additive was between 0.6 and 0.8 gram per milliliter, and all samples exhibited materially improved dispersibility and rate of solution in comparison to the original CMC.

Salt additives

Potassium chloride
Calcium chloride
Sodium fluoride
Sodium chloride
Potassium bromide
Sodium carbonate
Disodium hydrogen phosphate
Potassium iodide
Sodium nitrate
Sodium oxalate
Sodium glycolate
Sodium citrate
Sodium acetate
Sodium sulfate
Sodium phosphate

EXAMPLE 3

A series of runs was made employing as starting materials a powdered U. S. P. grade of gum tragacanth from S. B. Penick and Company, a powdered grade of sodium alginate known as Kelcosol, manufactured by the Kelco Company, and a powdered grade of sodium carboxymethyl hydroxyethyl cellulose, known as CMHEC, manufactured by Hercules Powder Company. These materials were all substantially pure, without salt additives. They initially all formed gel lumps when mixed with water and the rate of solution was generally unsatisfactory. Sufficient 15% sodium chloride solution was added to each to introduce 25 percent by weight, based on dry gum weight, of sodium chloride as additive. The treated samples were then dried, ground to convert each material into porous granules, and sieved, and the material passing through 40-mesh and retained on 100-mesh was tested for rate of solution and dispersibility. The bulk density of the classified sodium alginate was 0.77, of the CMHEC 0.67, and of the tragacanth 0.75 gram per milliliter, and each material exhibited markedly improved dispersibility and rate of solution in comparison to the original starting materials.

The invention is applicable in general to water-soluble gums which are soluble in both hot and cold water. Such gums include, by way of example, carboxyalkyl cellulose derivatives, such as carboxymethylcellulose, carboxyethyl cellulose, carboxypropyl cellulose, and the like; carboxyalkyl hydroxyalkyl cellulose derivatives, such as carboxymethyl hydroxyethyl cellulose, carboxyethyl hydroxyethyl cellulose, and the like; gum tragacanth, sodium alginate, psyllium seed, gum arabic, Irish moss, agar, algin, and the like. However, in the preferred form the invention is pertinent to carboxyalkyl cellulose derivatives. When CMC is employed, the CMC can be in either the impure or a substantially pure state. CMC can be prepared by the reaction of cellulose fibers with sodium hydroxide and sodium chloroacetate in the presence of an aqueous alcohol. It can also be prepared by other methods well known in the art. However, in accordance with one of the embodiments of the invention as heretofore set forth, CMC is separated from the reaction mixture and employed without any purification since the CMC in its impure form contains an adequate amount of reaction salts such as sodium chloride and sodium glycolate to carry out the invention. On the other hand, the CMC can be purified by washing the impure CMC with an 85% aqueous methyl alcohol solution or similar wash liquid, and subsequently a sufficient amount of a desired additive can be added to the purified CMC. In many instances it is preferred that the impure CMC be employed since an economic advantage is obtained by eliminating the purification procedures. However, for certain uses it is essential that the CMC be purified first, before addition of the desired additive.

In order to improve the water solubility of the CMC or other water-soluble gums in accordance with this invention, the particle size of the gum is important. In general, the particle size can range from 20 to 150 mesh. The particle size may vary from 40 to 100 mesh, and for optimum dispersibility and solution rate the particle size should vary from 60 to 100 mesh. Although particle size substantially within the range of 20–150 mesh is important for dispersibility and solution rate, it is permissible to have small amounts, in the order of 10 to 20% by weight, of particles either larger or smaller than 20–150 mesh without any pronounced adverse effect on dispersibility or rate of solution.

The importance of employing the proper particle size is shown by the following table. The data in this table were obtained by observing the dispersibility and solution rate of various screen fractions, as measured on U. S. standard mesh screens, of a CMC having a degree of substitution of 0.77 and a viscosity of 150 cps. in a 1% aqueous solution. This CMC contained 15% by weight of sodium chloride additive and after conversion to porous granules had a bulk density of 0.79 gram per cubic milliliter. For each fraction the solution rate was determined on a 1.4 weight percent solution of CMC in water at 65° C.

| Screen Fraction | Dispersibility | Solution Rate |
|---|---|---|
| Through 20 on 40 mesh | Good | 7.7 |
| Through 40 on 60 mesh | do | 3.9 |
| Through 60 on 80 mesh | do | 1.0 |
| Through 80 on 100 mesh | do | 0.8 |
| Through 100 on 200 mesh | Poor | 20+ |
| Through 200 | do | 20+ |

It will be observed from the above data that extremely fine particles are particularly undesirable in that they have pronounced adverse effect on dispersibility and solution rate. It is also apparent that solution rate becomes slower as the particles become coarser. Hence, for practical reasons it is undesirable to employ material having a particle size larger than 20 mesh, even though dispersibility of such particles is good.

Proper physical form is an important consideration in practicing this invention. The CMC or other water-soluble gum should be in the form of porous granules. This form is imparted to the gum by the addition of water or other gum solvent to the gum to swell the individual grains, after which they are dried, ground, and classified. The resulting product consists of free-flowing porous granules having a bulk density of at least about 0.35 gram per milliliter. Higher bulk densities, for example, as high as 1 gram per milliliter, can be used if desired. Generally, however, bulk densities will range between about 0.4 and 0.8 gram per milliliter, and preferably between about 0.4 and 0.6 gram per milliliter, it being desirable for the porous granular product to have bulk densities near the lower limit for bulk density.

Suitable salts in accordance with this invention are water-soluble alkali and alkaline earth metal salts of inorganic and organic acids, the water solutions of which are characterized by having a pH value not less than 4.5. One or more suitable salts can eb employed, as desired. As previously indicated, both sodium chloride and sodium glycolate are reaction by-products in the formation of CMC, and for the purposes of this invention these by-products are retained in the CMC after its formation without any purification treatment.

By "water-soluble" is meant at least sufficient solubility in water so that all of the salt employed as additive in the water-soluble gum is completely dissolved by the water used to dissolve the water-soluble gum. This represents the minimum degree of solubility, and ordinarily salt additives will be chosen which exhibit considerably greater solubility in water than this minimum.

Any alkali or alkaline earth metal salt of inorganic or organic acid which is soluble in water, and the solution of which has a pH value not less than 4.5, is suitable for the purposes of this invention. By way of example, suitable salts include lithium, sodium, potassium, rubidium, caesium, magnesium, calcium, strontium and barium salts of any inorganic or organic acid, and mixtures thereof, which salts are characterized by suitable water solubility and the solutions of which have a pH value of 4.5 or higher. A partial list of suitable acids, offered by way of illustration only and not as a limitation of the invention, whose alkali and alkaline earth metal salts are suitable for the purposes of this invention include hydrochloric, hydrobromic, hydroiodic, hydrofluoric, nitric, sulfuric, phosphoric, chloric, perchloric, nitrous, phosphorous, sulfurous, formic, acetic, glycolic, carbonic, oxalic, citric, phthalic, benzoic, naphthenic acids, and the like. Water solutions of suitable salt additives can be acid, neutral or basic with respect to the pH of the solution; however, such water solutions should have a pH value of 4.5 or higher.

Thus, the effective salts are selected from the group consisting of water-soluble alkali and alkaline earth metal salts of inorganic and organic acids, and mixtures thereof, the water solutions of which are characterized by a pH value not less than 4.5, it being understood that the additive may be a mixture of the by-product sodium chloride and sodium glycolate salts formed during the process of manufacturing CMC.

The incorporation of as little as 5 weight percent of sodium chloride or similar salt to CMC has been found to be effective to improve its water solution rate. However, in order to obtain good dispersibility of CMC in water, as well as an improved solution rate, at least 15 weight percent of the salt should be employed. The maximum amount of salt that can be used is variable. In some instances a maximum of 30% by weight is desirable but this maximum can be increased to as much as 50% by weight and higher. Increasing the amount of salt above this maximum has little if any effect upon the dispersibility and water solution rate of the gum.

The water-soluble gums of improved water solubility within the scope of this invention can be produced by various methods. For example, if a purified gum, such as CMC, is employed, improved water solubility can be imparted to it by adding a water solution of the salt, e. g., sodium chloride, to the dry gum in conventional mixing equipment such as an extruder, two-roll mill, ribbon mixer or sigma blade mixer. The product from this mixing step is then dried, pulverized and classified to the proper screen fraction in any of the conventional machines or units for carrying out these operations. Other methods of producing the improved products of this invention will be apparent to those skilled in the art from the above disclosure. The water-soluble gums of this invention are readily and rapidly dissolved in water with very little mechanical mixing or agitation to effect the dissolution.

What I claim and desire to protect by Letters Patent is:

1. As a new composition of matter, a water-soluble gum of improved water solubility selected from the group consisting of water-soluble salts of lower carboxyalkyl cellulose, water-soluble salts of lower carboxyalkyl hydroxyalkyl cellulose, water-soluble gum tragacanth, sodium alginate, psyllium seed, gum arabic, Irish moss, agar, and algin, said water-soluble gum having the form of porous granules, a bulk density of at least about 0.35 gram per milliliter, a particle size substantially within the range of 20 to 150 mesh and containing at least about 5 weight percent of at least one salt selected from the group consisting of water-soluble alkali metal salts and alkaline earth metal salts of inorganic and organic acids, the water solutions of which are characterized by having a pH value not less than 4.5.

2. As a new composition of matter, a water-soluble gum of improved water solubility comprising a water-soluble salt of lower carboxyalkyl cellulose selected from the group consisting of the alkali metal and ammonium salts of lower carboxyalkyl cellulose having the form of porous granules, a bulk density of at least about 0.35 gram per milliliter, a particle size substantially within the range of 20 to 150 mesh and containing at least about 5 weight percent of at least one salt selected from the group consisting of water-soluble alkali and alkaline earth metal salts of inorganic and organic acids, the water solutions of which are characterized by having a pH value not less than 4.5.

3. As a new composition of matter, a water-soluble gum of improved water solubility comprising a water-soluble salt of lower carboxyalkyl hydroxyalkyl cellulose selected from the group consisting of the alkali metal and ammonium salts of lower carboxyalkyl hydroxyalkyl cellulose having the form of porous granules, a bulk density of at least about 0.35 gram per milliliter, a particle size substantially within the range of 20 to 150 mesh and containing at least about 5 weight percent of at least one salt selected from the group consisting of water-soluble alkali and alkaline earth metal salts of inorganic and organic acids, the water solutions of which are characterized by having a pH value not less than 4.5.

4. As a new composition of matter, a water-soluble gum of improved water solubility comprising sodium carboxymethylcellulose having the form of porous granules, a bulk density of at least about 0.35 gram per milliliter, a particle size substantially within the range of 20 to 150 mesh and containing at least about 5 weight percent of at least one salt selected from the group consisting of water-soluble alkali and alkaline earth metal salts of inorganic and organic acids, the water solutions of which are characterized by having a pH value not less than 4.5.

5. As a new composition of matter, a water-soluble gum of improved water solubility comprising sodium carboxymethylcellulose having the form of porous granules, a bulk density of at least about 0.35 gram per milliliter, a particle size substantially within the range of 40 to 100 mesh and containing at least about 5 weight percent of sodium chloride.

6. As a new composition of matter, a water-soluble gum of improved water solubility comprising sodium carboxymethylcellulose having the form of porous granules, a bulk density of at least about 0.35 gram per milliliter, a particle size substantially within the range of 40 to 100 mesh and containing at least about 5 weight percent of sodium glycolate.

7. As a new composition of matter, a water-soluble gum of improved water solubility comprising sodium carboxymethylcellulose having the form of porous granules, a bulk density of at least about 0.35 gram per milliliter, a particle size substantially within the range of 40 to 100 mesh and containing at least about 5 weight percent of a mixture of sodium chloride and sodium glycolate.

References Cited in the file of this patent
UNITED STATES PATENTS

| | | |
|---|---|---|
| 2,376,656 | Buchanan | May 22, 1945 |
| 2,445,226 | Landers | July 13, 1948 |
| 2,517,577 | Klug et al. | Aug. 8, 1950 |
| 2,558,042 | Cornwell | June 26, 1951 |
| 2,566,501 | Smith et al. | Sept. 4, 1951 |